(12) United States Patent
Fetcenko et al.

(10) Patent No.: US 7,799,296 B2
(45) Date of Patent: *Sep. 21, 2010

(54) METHOD OF PRODUCING A NICKEL SALT SOLUTION

(75) Inventors: Michael A. Fetcenko, Rochester, MI (US); Cristian Fierro, Northville, MI (US); Avram Zallen, West Bloomfield, MI (US); Tim Hicks, Redford, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 1059 days.

This patent is subject to a terminal disclaimer.

(21) Appl. No.: 11/269,083

(22) Filed: Nov. 8, 2005

(65) Prior Publication Data

US 2006/0067874 A1    Mar. 30, 2006

Related U.S. Application Data

(63) Continuation-in-part of application No. 10/727,413, filed on Dec. 4, 2003, now Pat. No. 7,364,717.

(51) Int. Cl.
*C01B 17/00* (2006.01)

(52) U.S. Cl. ............ 423/146; 423/150.4; 423/150.5; 423/388; 423/395; 423/493; 423/544; 423/594.19

(58) Field of Classification Search ............... 423/146, 423/150.4, 150.5, 388, 395, 493, 544, 594.19
See application file for complete search history.

(56) References Cited

U.S. PATENT DOCUMENTS

| | | | | | |
|---|---|---|---|---|---|
| 1,936,829 | A | * | 11/1933 | Corson | 423/150.5 |
| 3,869,257 | A | * | 3/1975 | Beutner et al. | 423/544 |
| 3,962,051 | A | * | 6/1976 | Symens et al. | 205/584 |
| 4,201,648 | A | * | 5/1980 | Subramanian et al. | 205/589 |
| 4,323,541 | A | * | 4/1982 | Saarinen et al. | 423/37 |
| 4,901,744 | A | * | 2/1990 | Hansen | 134/64 R |
| 5,628,817 | A | * | 5/1997 | Fugleberg et al. | 75/743 |
| 6,432,580 | B1 | * | 8/2002 | Fierro et al. | 429/223 |
| 7,364,717 | B2 | * | 4/2008 | Fierro et al. | 423/544 |

* cited by examiner

*Primary Examiner*—Steven Bos
(74) *Attorney, Agent, or Firm*—David W. Schumaker

(57) ABSTRACT

A method for converting nickel into a nickel salt solution. Nickel is dissolved and reacted in an oxygen-enriched acidic solution to produce a nickel salt solution as illustrated in the following chemical equation, wherein X is a conjugate base:

$$Ni + H_2X + \tfrac{1}{2}O_2 \rightarrow NiX + H_2O.$$

101 Claims, 4 Drawing Sheets

METHOD OF PRODUCING A NICKEL SALT SOLUTION

CROSS REFERENCE TO RELATED APPLICATIONS

The present application is a continuation-in-part of, and is entitled to the benefit of the earlier filing date and priority of, U.S. patent application Ser. No. 10/727,413, which is assigned to the same assignee as the current application, entitled "PROCESS FOR MAKING NICKEL HYDROXIDE," filed Dec. 4, 2003, now U.S. Pat. No. 7,364,717, the disclosure of which is hereby incorporated by reference.

FIELD OF THE INVENTION

The present invention relates to a process for making a metal salt solution. More specifically, the present invention involves reacting nickel with an acidic solution to produce a nickel salt solution.

BACKGROUND

Nickel salt solutions are very useful for a number of applications, particularly electroplating and production of nickel hydroxide. While electroplating has been a main use for nickel salt solutions, the production of nickel hydroxide has become an increasingly popular application for nickel salt solutions, particularly nickel sulfate solution, due to the growing demand for batteries utilizing nickel hydroxide as an active material. Two of the main types of batteries that utilize nickel hydroxide as an active material are the Ni—Cd (nickel cadmium) type and the Ni-MH (nickel metal hydride) type. In both Ni-MH and Ni—Cd batteries the positive electrodes are made primarily of nickel hydroxide active material.

Ni-MH cells utilize a negative electrode that is capable of the reversible electrochemical storage of hydrogen. Ni-MH cells usually employ a positive electrode of nickel hydroxide material. The negative and positive electrodes are spaced apart in an alkaline electrolyte.

Upon application of an electrical current across a Ni-MH cell, the Ni-MH material of the negative electrode is charged by the absorption of hydrogen formed by electrochemical water discharge reaction and the electrochemical generation of hydroxyl ions. The negative electrode reactions are reversible. When the Ni-MH cell is connected to a load, the metal hydride active material of the negative electrode is discharged thereby releasing the stored hydrogen to form water and release electrons. The charging/discharging process for the negative electrode of a Ni-MH cell is governed by the following reversible reaction:

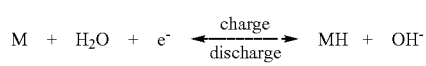
(1)

Upon application of an electrical current across a Ni-MH cell, the Ni (OH)$_2$ material of the positive electrode is charged by the formation of NiOOH from the Ni (OH)$_2$, the electrochemical generation of water, and the release of electrons. The positive electrode reactions are reversible. When the Ni-MH cell is connected to a load, the active material of the positive electrode is discharged thereby forming Ni (OH)$_2$ and electrochemically generating hydroxyl ions. The charging/discharging process for a nickel hydroxide positive electrode in an alkaline electrochemical cell is governed by the following reversible reaction:

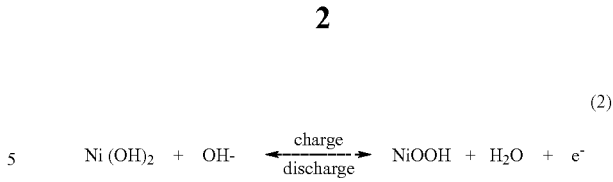
(2)

The use of nickel hydroxide, Ni(OH)$_2$, as a positive electrode material for batteries is generally known. See for example, U.S. Pat. No. 5,523,182, issued Jun. 4, 1996 to Ovshinsky et al., entitled "Enhanced Nickel Hydroxide Positive Electrode Materials For Alkaline Rechargeable Electrochemical Cells", the disclosure which is hereby incorporated herein by reference.

Several forms of positive electrodes presently exist and include, but are not limited to, sintered, foamed, and pasted electrode types. Processes for making positive electrodes are generally known in the art, see for example U.S. Pat. No. 5,344,728 issued to Ovshinsky et al., the disclosure of which is herein incorporated by reference. The particular process used can have a significant impact on an electrode's performance. For example, conventional sintered electrodes normally have an energy density of around 480-500 mAh/cc. Sintered positive electrodes are constructed by applying nickel powder slurry to a nickel-plated, steel base followed by sintering at high temperature. This process causes the individual particles of nickel to weld at their points of contact, resulting in a porous material that is approximately 80% open volume and 20% solid metal. The sintered material is then impregnated with active material by soaking it in an acidic solution of nickel nitrate, followed by the conversion to nickel hydroxide by reaction with an alkali metal hydroxide. After impregnation, the material is then subjected to electrochemical formation.

To achieve significantly higher loading, the current trend has been moving away from sintered positive electrodes and moving toward pasted electrodes. Pasted electrodes generally comprise nickel hydroxide particles in contact with a conductive network or substrate, most commonly foam nickel. Several variants of these electrodes exist and include plastic-bonded nickel electrodes, which utilize graphite as a microconductor, and pasted nickel fiber electrodes, which utilize spherical nickel hydroxide particles loaded onto a high porosity, conductive nickel fiber or nickel foam support.

The production of low cost, high capacity nickel hydroxide is critical to the future commercialization of Ni-MH batteries. As with electrode formation, the properties of nickel hydroxide also differ widely depending upon the production method used. Generally, nickel hydroxide is produced using a precipitation method in which a nickel salt solution, such as nickel sulfate solution and a hydroxide salt are mixed together resulting in the precipitation of nickel hydroxide.

It has been discovered that nickel hydroxide suitable for use in a battery electrode should have an apparent density of 1.4-1.7 g/cm$^3$, a tap density of about 1.8-2.3 g/cm$^3$, and a size range of about 5-50 μm. Active, nickel hydroxide particles are preferably spherical in shape with a high packing density and a narrow size distribution. Preferably, average particle size should be about 10 μm and tap density should be about 2.2 g/cm$^3$. Paste made with nickel hydroxide having the aforementioned properties has good fluidity and uniformity, and thus allow the fabrication of high capacity, uniformly loaded electrodes. The use of this kind of nickel hydroxide also improves the utilization of the active material and the discharge capacity of the electrode. If the process for making nickel hydroxide is not carefully controlled, the precipitated nickel hydroxide will have an irregular shape and/or low tap density. For example, if the rate of reaction is too fast, the precipitate formed may be too fine resulting in a low tap density. A fine powder having a low tap density requires longer filtering or washing times and increases the adsorption of water on the surface of the nickel hydroxide particles. Furthermore, if the precipitated nickel hydroxide particles have too wide a size distribution (ranging from 1 to hundreds of microns), the nickel hydroxide may require pulverization to render it useful. Electrodes formed with nickel hydroxide having a low tap density may also lack high capacity and high energy density. For these reasons and others, an active powder having an irregular shape and/or low tap density is less desirable for use as a high capacity battery electrode material.

In order to produce substantially spherical nickel hydroxide having a high tap density, particles are gradually grown under carefully controlled process conditions. A nickel salt solution is combined with an ammonium ion. In solution, the nickel salt forms complex ions with ammonia. When caustic is added, nickel hydroxide is then gradually precipitated by decomposition of the nickel ammonium complex. The reaction rate is difficult to control, so methods have been introduced to separate critical steps in the production process to compensate for said difficulties. For example, U.S. Pat. No. 5,498,403, entitled "Method for Preparing High Density Nickel Hydroxide Used for Alkali Rechargeable Batteries", issued to Shin on Mar. 12, 1996, the disclosure of which is herein incorporated by reference, discloses a method of preparing nickel hydroxide from a nickel sulfate solution using a separate or isolated amine reactor. Nickel sulfate solution is mixed with ammonium hydroxide in an isolated amine reactor to form a nickel ammonium complex. The nickel ammonium complex is removed from the reactor and sent to a second mixing vessel or reactor where it is combined with a solution of sodium hydroxide to obtain nickel hydroxide. Such a method relies heavily on a raw material sources of very high purity or what is termed throughout the ensuing specification as primary nickel.

Thus, particular notice should be taken in the fact that the current process used widely throughout the industry for making positive electrode materials, such as those described above, have utilized expensive, high grade, and highly pure primary nickel for the production of nickel salt starter solutions. As modern process technology and automation have reduced the cost of labor in the production of nickel hydroxide, the cost of primary nickel and its associated salts have become a significant factor in determining the cost of nickel hydroxide as used for active electrode materials, accounting for up to 60% of the direct manufacturing cost of the final nickel hydroxide.

Primary nickel used for the production of active materials is typically derived from the ores of nickel sulfide and nickel oxide and purified by electro-processing. Nickel sulfide ores are refined by flotation and roasting to nickel oxide. Nickel oxide ores are typically refined by hydrometallurgical refining, such as leaching with ammonia. Refined nickel ore is usually cast into nickel anodes for distribution as primary nickel. The highly pure, primary nickel may then be dissolved into solution, such as a sulfate solution, and sold as highly pure aqueous nickel sulfate, with a frequent end use also being nickel electroplating and electroless nickel plating.

The average amount of nickel estimated to be present in the earth's crust is only about 0.0084 wt %, as reported on page 14-14 of the Handbook of Chemistry and Physics, 78th Edition, 1997-1998. Because nickel is used for many things, including the production of stainless steel, the demand for nickel is very high, making it a relatively expensive metal. Although primary nickel is a commodity product, it is subject to wild market swings in price. For example, during the period of Jun. 1, 1999 through Jun. 1, 2000, nickel prices have seen dramatic volatility having a low of $2.16/lb and a high of $4.77/lb as reported on the London Metal Exchange. As a means of off-setting or hedging against the increasing cost of nickel, a number of large producers of nickel hydroxide have gone so far as to purchase ownership interests in nickel mines. Smaller manufactures of nickel hydroxide, unable to offset rising nickel prices, have been left at a competitive disadvantage.

Current processes for the production of aqueous nickel sulfate ($NiSO_4$) involve dissolving nickel powder in sulfuric acid ($H_2SO_4$) which produces nickel sulfate liquid and hydrogen gas. Such processes for the production of nickel sulfate are governed by the following reaction:

$$Ni + H_2SO_4 \rightarrow NiSO_4 + H_2 \qquad (3)$$

This process, however, must be conducted in a very secure environment, due to the volatility of hydrogen gas, which creates a hazardous environment. Additionally, nickel powder (particles less than 0.1 mm) is expensive when compared to bulk nickel (particles greater then 0.1 mm).

A similar reaction may be used to produce copper sulfate. U.S. Pat. No. 6,294,146 to Benet discloses a continuous chemical reaction for producing copper sulfate crystals including a filtering step for separating the copper sulfate crystals from the aqueous reaction medium. During the production of copper sulfate, oxygen and sulfuric acid are reacted with copper whereby sulfuric acid is the limiting reagent. Benet also discloses a process for removing precious metals from base metal alloys where the precious metals are dissolved into solution and the remaining metals such as Ni and Cu remain in the filtrate. While Benet teach methods for producing copper sulfate crystals, there is no teaching of producing salts including metals other than copper. Benet also does not teach the production of metal salt solutions, particularly nickel sulfate solutions for which there is an increasing demand in industry.

While there are presently many known processes for producing metal salts, there still remains a need in the art for improved processes for producing salt solutions, particularly nickel sulfate solution as used for electroplating or nickel hydroxide production. Furthermore, there exists a need for a safe cost effective process for making nickel sulfate solution from nickel, wherein hydrogen gas is not liberated into the atmosphere as a reaction byproduct.

SUMMARY OF THE INVENTION

Disclosed herein, is a process for converting nickel metal to a nickel salt solution which may be used to produce nickel hydroxide. The process for converting nickel metal to a nickel salt solution generally comprises the steps of 1) providing a nickel metal to a reaction vessel, 2) providing an oxygen-enriched acidic solution to the reaction vessel, and 3) reacting the nickel metal with said oxygen-enriched acidic solution.

The oxygen-enriched acidic solution may comprise one or more acids selected from sulfuric acid, nitric acid, and hydrochloric acid. Preferably, the oxygen-enriched acidic solution comprises sulfuric acid. The oxygen-enriched acidic solution has an acid concentration sufficient to dissolve the nickel in the nickel metal. Preferably the oxygen-enriched acidic solution has an acid concentration of about 1.0 M to 2.4 M. The oxygen enriched acidic solution may be at least 25% saturated with oxygen. Preferably, the oxygen enriched acidic solution is at least 50% saturated with oxygen. Preferably, the oxygen enriched acidic solution is at least 75% saturated with oxygen. Preferably, the oxygen enriched acidic solution is 100% saturated with oxygen.

The nickel metal may comprise a nickel metal powder. Preferably, the nickel metal comprises a plurality of nickel particles having an average size of at least 0.1 mm. The nickel metal may be selected from pure nickel, nickel ores, nickel alloys, and contaminated nickel.

The nickel salt solution may comprise a nickel sulfate solution, a nickel nitrate solution, or a nickel chloride solution. Preferably, the nickel salt solution comprises a nickel sulfate solution. The nickel sulfate solution preferably has a concentration of nickel metal of about 10 weight percent. The nickel sulfate produced in accordance with the present invention may have a carbon content less than 20 ppm by mass without the use of a filter.

The step of providing an oxygen-enriched acidic solution may comprise the steps of 1) supplying an acidic solution to the reaction vessel, 2) supplying an oxygen containing stream to the reaction vessel, and 3) contacting the acidic solution with the oxygen containing stream to dissolve oxygen from the oxygen containing stream into the acidic solution. The oxygen containing stream may also be bubbled into the acidic solution to form the oxygen-enriched acidic solution.

The pressure inside the reaction vessel is in a range of about 10 psi to about 150 psi. Preferably, the oxygen containing stream is supplied to the reaction vessel at a pressure greater than the interior pressure of the reaction vessel. More preferably, the pressure of the oxygen containing stream is at least 2 psi greater than the interior pressure of the reaction vessel. The oxygen containing stream may comprise oxygen gas, air or a mixture thereof.

The process for converting nickel metal to a nickel salt solution may further comprise the step of 4) supplying heat to the interior of the reaction vessel while the oxygen-enriched solution is reacting with the nickel metal. The interior of the reaction vessel may be heated to a temperature in the range of 87° C. to 93° C.

The reaction of nickel with the oxygen-enriched acidic solution may form more moles of water than moles of hydrogen gas. The moles of hydrogen gas formed from the reaction of nickel with an oxygen-enriched acidic solution is less than the moles of hydrogen gas produced from the reaction of nickel with a non-oxygen-enriched acidic solution having the same acid concentration as the oxygen-enriched acidic solution.

DETAILED DESCRIPTION OF THE PREFERRED EMBODIMENTS OF THE INVENTION

Figure 1:
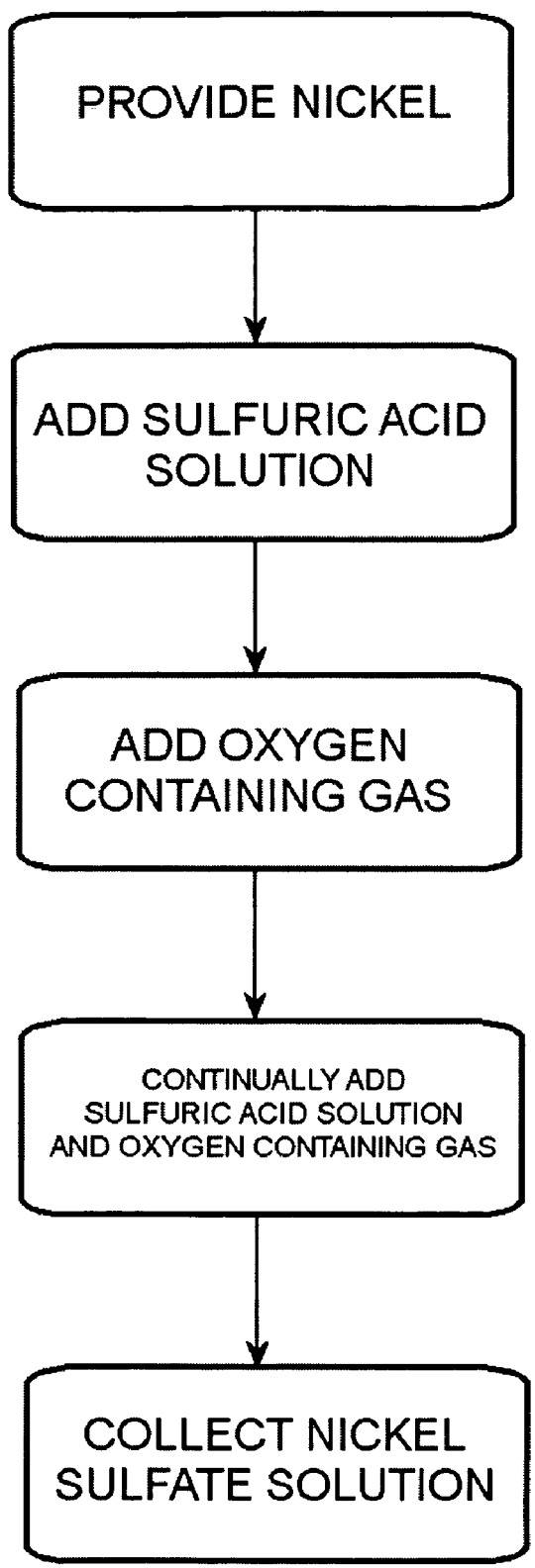
FIG. 1, is a process flow diagram of a process for preparing nickel sulfate in accordance with the present invention.

In accordance with the present invention there is provided a method of converting nickel into a nickel salt. The present invention allows for significant cost savings over processes known in the art. The method allows for the use of larger size nickel raw materials such as pellets, squares, or pieces of any size and shape as long as they may be accommodated within the reactor. At present, nickel powders are currently used throughout the industry to produce nickel salt solutions such as nickel sulfate. The nickel powders are typically fine nickel powders having a particle size well under 100 microns (8-15 microns are typical). The fine nickel powders are specialty products that command a much higher premium than the larger sized nickel that is used with the current process. Additional cost may be saved by the method in accordance with the present invention as little or no filtration of the final product is required as the final product has minimal carbon content. Nickel powder, as currently used throughout the industry for making salt solutions such as nickel sulfate, has a carbon content of approximately 0.1% to over 1.0% while larger size nickel materials have a carbon content of approximately 0.01% or less. Therefore, the nickel sulfate produced in accordance with the present invention may have a carbon content less than 20 ppm by mass without the use of a filter.

The present invention may also applicable to metals which provide salts having solubilities similar to nickel salts. Preferably the metal salts have a solubility greater than 50 g/100 ml at standard temperature and pressure (STP). Metals which provide salts having solubilities similar to nickel salts are Co, Mg, Zn, and Mn. Certain metals such as Cu, for example may not be used to produce salt solutions in accordance with the present invention due to the metals producing salts having a low solubility which require further filtering steps for removal from the liquid reaction medium. Elements similar to Cu that have solubilities less than 50 g/100 ml at STP are Ru, Rh, Pd, Pt, and Ag.

In accordance with the present invention, nickel is reacted with an oxygen-enriched acidic solution to produce a nickel salt solution as illustrated by the following chemical equation, wherein X represents a conjugate base.

$$Ni+H_2X+\tfrac{1}{2}O_{2(aq)} \rightarrow NiX+H_2O \qquad (4)$$

Analogous reactions that utilize monoprotic and triprotic acids are also within the scope of the present invention. As the oxygen-enriched acidic solution is consumed by the reaction, an oxygen containing gas, such as oxygen gas, air or a combination thereof, and an acidic solution may be supplied to the allow the reaction to continue. The acidic solution and the oxygen containing gas may be supplied to the reaction until all of the nickel is reacted to form nickel salt. Preferably, the nickel is the limiting reagent in reaction (4) which results in some of the acid being left unreacted. Without being bound by theory, the present inventors believe that in typical reactions between nickel and an acid, hydrogen produced by the reaction between the nickel and the acid is adsorbed on the surface of the nickel and prevents, to some extent, the acid from contacting the nickel. The dissolved oxygen in the acidic solution is able to promote the reaction between the acid and the nickel by reacting with the hydrogen produced during the reaction to form water thereby promoting contact between the acidic solution and the nickel.

To speed up the rate of reaction, heat may be supplied to the reaction vessel and/or the reactant streams. While not wishing to be bound by theory, the present inventors believe that the reaction temperature influences the solubility of the reaction products. Preferably, the reaction vessel and/or the reactant streams are heated to a temperature in the range of 70° C. to 100° C., more preferably 85° C. to 95° C., most preferably 87° C. to 93° C. The rate of reaction may also be increased by pressurizing the interior of the reaction vessel and/or the reactant supply streams to assist in dissolving the oxygen into the acidic solution. The pressure of the interior of the reaction vessel and/or the reactant supply streams may be up to 150 psi. Preferably, the pressure of the oxygen containing gas stream is about 2 psi greater than the pressure of the interior of the reaction vessel or the pressure of the acidic solution stream.

An oxygen-enriched acidic solution as used herein, is defined as an acidic solution having an oxygen concentration above the standard oxygen concentration in an acidic solution exposed to the atmosphere at STP. The oxygen enriched acidic solution may be at least 25% saturated with oxygen. Preferably, the oxygen enriched acidic solution is at least 50% saturated with oxygen. Preferably, the oxygen enriched acidic solution is at least 75% saturated with oxygen. Preferably, the oxygen enriched acidic solution is 100% saturated with oxygen. For example, a 1M solution of sulfuric acid has a saturated oxygen concentration of approximately 0.8 mmol/l at 55° C. Preferably the oxygen enriched acidic solution supplied to the reaction vessel has an oxygen concentration greater than 0.8 mmol/l. The oxygen-enriched acidic solution may be produced by dissolving oxygen into an acidic solution. The oxygen containing gas stream, the acidic solution stream, and/or the reaction vessel may be pressurized to assist in dissolving oxygen into the acidic solution. The oxygen containing gas may be bubbled into the acidic solution. The oxygen dissolved in the acidic solution, as opposed to oxygen bubbles, is highly dispersed and able to contact nickel sites in contact with the acidic solution. The solubility of oxygen in the acidic solution depends on the oxygen partial pressure, temperature, an concentration of salts or acids in solution. The concentration of salts or ions in solution is important because in their presence the total amount of water available for interaction with oxygen will be reduced and therefore a decrease in oxygen solubility will occur. In achieving an oxygen enriched acidic solution, both temperature and pressure play an important role. Temperature is important since gases such as oxygen release heat in an exothermic process during dissolution and shown by the following equation:

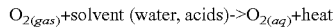

$$O_{2(gas)} + \text{solvent (water, acids)} \rightarrow O_{2(aq)} + \text{heat}$$

Therefore, by increasing the temperature, the above reaction will slow down by decreasing the rate of reaction. Pressure is also important as the amount of gas that can be dissolved is proportional to the partial pressure of the gas above the liquid, as the pressure tends to force the oxygen molecules into solution.

The acidic solution generally comprises one or more acids capable of dissolving nickel and reacting with the dissolved nickel to form a nickel salt. The acidic solution may comprise one or more acids selected from sulfuric acid, nitric acid, and hydrochloric acid. The concentration of the acidic solution should be sufficient to dissolve the nickel and promote the chemical reaction (4) as shown above. The concentration of the acidic solution is preferably in the range of 0.1 M to 3.7 M, more preferably in the range of 0.7 M to 3.0 M, most preferably in the range of 1.0 M to 2.4 M. The pH of the acidic solution is preferably in the range of about 0.1 to 6.0, more preferably in the range of about 2.5 to 4.0.

The nickel may be provided as nickel metal, nickel alloys, nickel ores, or contaminated nickel metal. Nickel metal as defined herein contains 10.0 weight percent or less impurities and contaminated nickel metal as defined herein contains greater than 10.0 weight percent impurities. Nickel alloys as defined herein is an alloy containing nickel and at least one other metal. The nickel may be in the form of pellets or ingots having a size in the range of 1 µm to several meters or any size compatible with the one or more reactors used for the process described herein. Preferably, the nickel has an average particle size greater than 0.1 mm, more preferably greater than 1.0 mm, most preferably, greater than 10 mm. Additionally, nickel scrap or nickel squares may also be used. Bulk nickel as defined herein refers to nickel having an average particle size greater than 1 µm.

The resulting nickel salt solution preferably has a nickel concentration less than 140 g Ni/l to prevent the nickel salt from crystalizing and falling out of solution. The nickel salt may include one or more salts selected from nickel sulfate, nickel nitrate, or nickel chloride. Other nickel salts may be produced depending on the types of acids utilized to make the nickel salt. After forming the nickel salt solution, the nickel salt may be removed from the nickel salt solution, or the nickel salt solution may be used for various applications.

In accordance with a preferred embodiment of the present invention there is provided a method of converting nickel into nickel sulfate. Nickel is reacted with an oxygen-enriched sulfuric acid solution as illustrated by the following chemical equation.

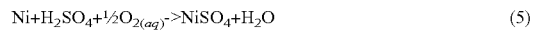

$$Ni + H_2SO_4 + \tfrac{1}{2}O_{2(aq)} \rightarrow NiSO_4 + H_2O \qquad (5)$$

As the sulfuric acid and the oxygen dissolved in the sulfuric acid solution are consumed by the reaction, an oxygen containing gas and a sulfuric acid solution may be supplied to the reaction to allow the reaction to continue. Preferably the nickel is the limiting reagent in equation (5). The oxygen containing gas may be oxygen gas, air, or a mixture thereof. Using the novel process disclosed herein the reaction (5) produces a nickel sulfate solution which may be immediately used for the production of nickel hydroxide. Sulfuric acid and an oxygen are preferably added in excess to insure all of the nickel reacts to form aqueous nickel sulfate.

FIG. 1 is a block diagram illustrating a preferred embodiment of the novel process described herein. Nickel is provided, preferably in one or more corrosion resistant reactors. It should be noted that any type reactor, batch or continuous, may be used to produce the desired reaction. Fiberglass is the preferred material of construction for the reactor, however, other materials such as teflon, PVDF, or Kynar lined steel an and other alloys may be used. Similarly, other components used in the process such as flow lines, pumps and containers should be resistant to corrosion caused by sulfuric acid. The sulfuric acid solution is added to the reactor from an acid container. Preferably the concentration of the sulfuric acid solution is from about 0.1 M to about 3.7 M, more preferably about 0.7 M to about 3.0 M, most preferably 2.0 M to 2.4 M. The concentration of the sulfuric acid solution may be higher or lower than the preferred range provided the desired reaction occurs and the appropriate pH is maintained. The pH of the sulfuric acid solution is preferably in the range of about 0.1 to 6.0, more preferably in the range of about 2.5 to 4.0. The temperature of the at least one reactor is preferably in the range of 20° C. to 100° C., more preferably in the range of 90° C. to 95° C. The flow of reactants within the reactor is preferably above laminar flow (>2100 as calculated by the dimensionless ratio $D_{ub}\rho/\mu$) to ensure adequate mixing and contact between the reactants. After the sulfuric acid begins to react with the nickel inside the one or more reactors, an oxygen containing gas is provided to the one or more reactors to produce the desired chemical reaction shown above in reaction (5). Alternatively, the sulfuric acid may be enriched with oxygen prior to being supplied to the one or more reactors. The oxygen containing gas may also be supplied to the reaction vessel prior to supplying the sulfuric acid solution. As the oxygen containing gas is supplied to the reaction, oxygen dissolves into the sulfuric acid solution thereby enriching the sulfuric acid solution with oxygen. Oxygen may be added to the reaction via a pressurized supply line or may be bubbled into the acidic solution. By utilizing an oxygen-enriched sulfuric acid solution, the production of hydrogen gas may be minimized or avoided altogether. Sulfuric acid and oxygen containing gas may be continually added in excess to the one or more reactors until all the nickel has been dissolved. Preferably, the nickel is the limiting reagent in the reaction. The nickel sulfate solution is collected in a collection receptacle for use as desired. Preferably, the nickel sulfate solution has a nickel concentration of about 10 weight %.

After the nickel sulfate solution has been collected, water may be evaporated from the nickel sulfate solution to precipitate a nickel sulfate solid. The nickel sulfate solid may be separated from the solution by any suitable separation process, such as filtration, decantation, etc.

Figure 2:
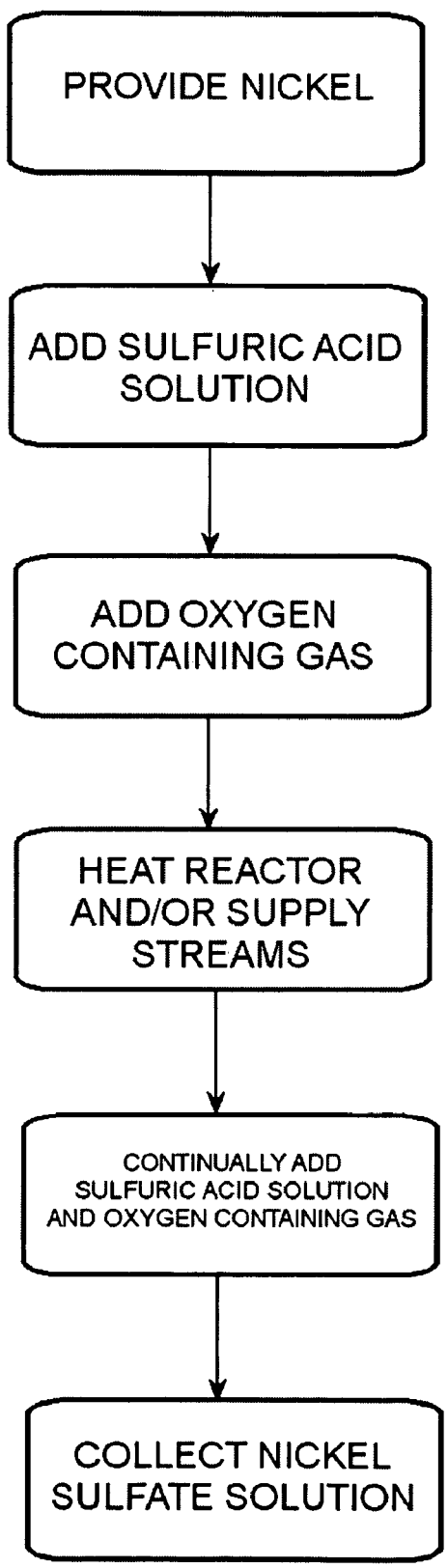
FIG. 2, is a process flow diagram of a process for preparing nickel sulfate in accordance with the present invention, wherein heat is provided to the reaction.

FIG. 2, is a block diagram illustrating another preferred embodiment of the present invention wherein heat is supplied to the one or more reactors or the reactant supply streams to increase the rate of reaction. Preferably, the inside of the one or more reactors and/or the supply stream may be heated to a temperature in the range of 90° C. and 95° C. The one or more reactors and/or the supply streams may be heated by any applicable heating source, such as but not limited to a hot plate, steam, or wrap around heating coil. Steam, however, is the preferred method of heating. It should be noted that the heating step of FIG. 3 may occur at any point in the process to speed the rate of reaction, however, the heating step preferably occurs before the nickel begins reacting with the sulfuric acid. The rate at which the nickel dissolves is dependent on the size the reactor and the amount of nickel, size of the nickel particles, temperature, pH, oxygen flow, amount of oxygen dissolved in the acidic solution, and dispersion or oxygen. Preferably, the nickel dissolves at a rate greater than 0.1 g/s.

After the nickel sulfate solution having the desired nickel concentration is produced, the nickel sulfate solution may be converted to nickel hydroxide for use as a positive electrode material. The nickel sulfate solution may be converted to nickel hydroxide using a process such as those described in U.S. Pat. No. 6,444,363 issued to Benet et al. on Sep. 3, 2002 and U.S. Pat. No. 6,432,580 issued to Fierro et al. on Aug. 13, 2002, both of which are hereby incorporated herein by reference.

Figure 3:
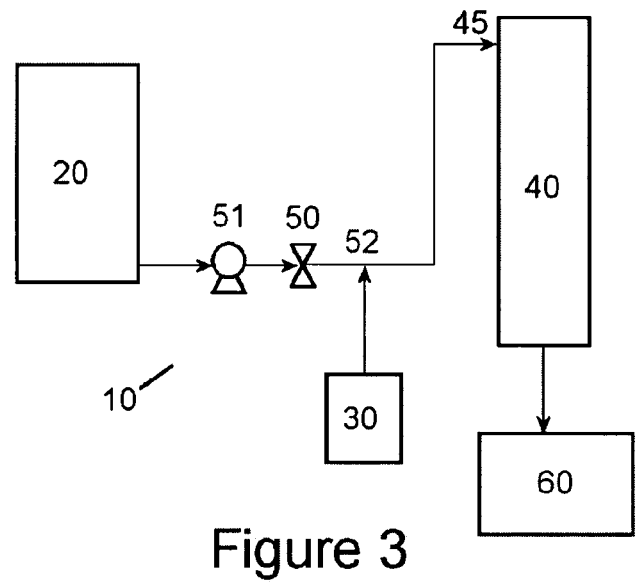
FIG. 3, is an illustration of a first embodiment of the apparatus used to produce nickel sulfate in accordance with the present invention.
Figure 4:
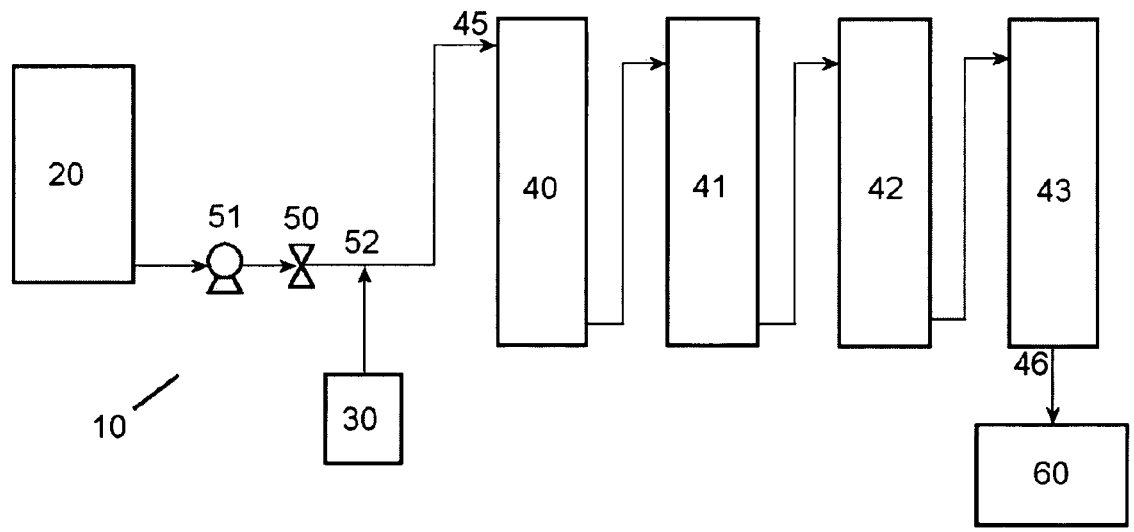
FIG. 4, is an illustration of a second embodiment of the apparatus used produce nickel sulfate in accordance with the present invention.

FIG. 3, is a depiction of the processing apparatus 10 used to make nickel sulfate in accordance with the present invention. The apparatus 10 generally comprises an acid container 20 at least partially filled with a sulfuric acid solution, an oxygen supply 30 and at least one reactor 40 having nickel provided therein. Preferred construction materials for the reactor 40 include but are not limited to steel coated with polytetrafluoroethylene (PTFE), polyvinylidene fluoride (PVDF), chlorinated polyvinyl chloride (CPVC), synthetic rubber such as VITON®, or fiberglass. When utilizing more than one reactor, the reactors 40, 41, 42 and 43 are connected in series, as illustrated in FIG. 4. A valve 50 disposed between the pump 51 and the oxygen containing gas inlet 52, allows the sulfuric acid solution to flow to the reactor 40. Preferably, the sulfuric acid solution is pumped into the top portion of the reactor 40. An oxygen containing gas is supplied to the sulfuric acid stream through the oxygen containing gas inlet 52 before the sulfuric acid solution reaches the reactor 40, thereby enriching the sulfuric acid solution with oxygen. As the oxygen-enriched sulfuric acid enters the reactor 40 and contacts the nickel, the nickel dissolves into solution. The level of liquid in each reactor 40 should be maintained at or above the level of the reactor inlet 45. The solution is forced out near the bottom portion of the reactor 40 through a reactor outlet 46 and is transferred to a collection receptacle 60. Preferably, the acid container 20 also acts as the collection receptacle for the nickel sulfate solution. By utilizing the acid container as the collection receptacle, any unreacted sulfuric acid continues to flow through the system and react with the nickel.

EXAMPLE

The following experiment was performed using one reactor comprised of steel coated with polytetrafluoroethylene as shown in the embodiment illustrated in FIG. 3. The reactor was a reactor column having a height of 7 feet with an inner diameter of 2 inches. The nickel pellets set into the reactor column were 99.99% nickel and had an average size of 0.254 to 3.81 cm (0.1 to 1.5 inches) in diameter. The weight of the nickel pellets set into the reactor column was about 25 pounds. The sulfuric acid container contained about 0.5 gallons of a sulfuric acid solution having a pH of about 3.0. The sulfuric acid solution in the container was heated by a hot plate to a temperature of between about 90° C. to about 95° C. The sulfuric acid solution was introduced to the reactor at a pressure of about 125 psi. Oxygen gas was introduced into the sulfuric acid solution between the pump and the reactor column at a pressure slightly above the pressure of the sulfuric acid solution. The sulfuric acid solution and oxygen gas flowed into the reactor and began reacting with the nickel. The reaction continued for approximately 15 hours until the concentration of nickel sulfate exceeded the weight % of nickel. The nickel sulfate was separated from the solution and about 1.8 kg of nickel was retrieved in solution.

The nickel sulfate was then converted into nickel hydroxide via a precipitation method. The nickel hydroxide was then separated from the solution and incorporated into positive battery electrodes which were placed in a battery and tested for performance. The positive electrodes were tested against positive battery electrodes utilizing a standard nickel hydroxide material. The standard nickel hydroxide material is a nickel hydroxide with co-precipitated zinc and cobalt from Tanaka Chemical Company.

To form the positive electrodes, an positive electrode active material was formed and deposited on a conductive substrate. The positive electrode active material was formed from 87.93 weight percent of the nickel hydroxide material, 4.9 weight percent cobalt, 5.9 weight percent cobalt oxide, and 0.97 weight percent polytetrafluoroethylene, and 0.3 weight percent carboxymethyl cellulose (CMC).

The negative electrode electrodes were standard negative electrodes including a negative electrode active material pasted on a conductive substrate. The negative electrode active material had a composition of 97.44 weight percent of an $AB_5$ hydrogen storage alloy, 0.49 weight percent carbon black, 0.49 weight percent polyacrylic salt, 0.12 weight percent carboxymethylcellulose, and 1.46 weight percent polytetrafluoroethylene.

Figure 5:
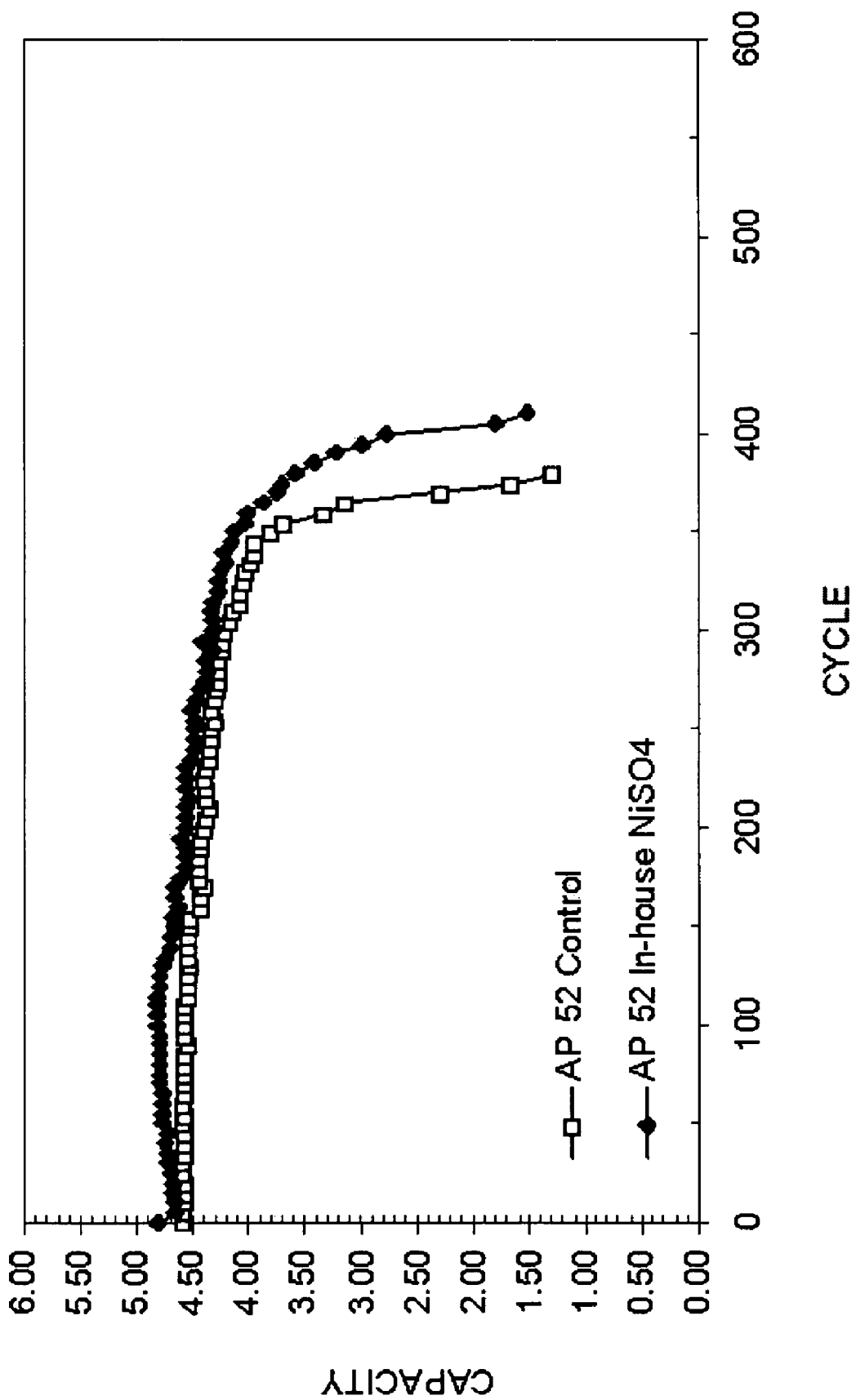
FIG. 5, is a plot showing the performance of nickel hydroxide formed from nickel sulfate produced in accordance with the present invention.

The battery including the positive electrode made with nickel hydroxide formed from the nickel sulfate in accordance with the present invention (♦) showed an increase in capacity and cycle life over the battery including the positive electrode formed from the standard nickel hydroxide material (□). The results from the tests are shown in FIG. 5.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A process for converting nickel containing material to a nickel salt solution comprising the steps of:
   1) providing said nickel containing material containing at least one material selected from the group consisting of pure nickel metal, nickel alloys, nickel ores and contaminated nickel metal to a reaction vessel;
   2) providing an oxygen-enriched acidic solution to said reaction vessel; and
   3) reacting said nickel containing material with said oxygen-enriched acidic solution to produce said nickel salt solution.

2. The process according to claim 1, wherein said oxygen-enriched acidic solution comprises one or more acids selected from the group consisting of sulfuric acid, nitric acid, and hydrochloric acid.

3. The process according, to claim 1, wherein said oxygen-enriched acidic solution comprises sulfuric acid.

4. The process according to claim 3, wherein said oxygen-enriched acidic solution has an acid concentration of about 1.0 M to 2.4 M.

5. The process according to claim 1, wherein said oxygen-enriched acidic solution has an acid concentration sufficient to dissolve the nickel in said nickel containing material.

6. The process according to claim 1, wherein said step of providing an oxygen-enriched acidic solution comprises the steps of:
   1) supplying an acidic solution to said reaction vessel;
   2) supplying an oxygen containing stream to said reaction vessel; and
   3) contacting said acidic solution with said oxygen containing stream to dissolve oxygen from said oxygen containing stream into said acidic solution.

7. The process according to claim 6, wherein the pressure inside said reaction vessel is in a range of about 10 psi to about 150 psi.

8. The process according to claim 6, wherein said oxygen containing stream is supplied to said reaction vessel at a pressure greater than the interior pressure of said reaction vessel.

9. The process according to claim 8, wherein the pressure of said oxygen containing stream is at least 2 psi greater than the interior pressure of said reaction vessel.

10. The process according to claim 6, wherein said oxygen containing stream comprises oxygen gas, air or a mixture thereof.

11. The process according to claim 1 further comprising the step of:
   3) supplying heat to the interior of said reaction vessel while said oxygen enriched solution is reacting with said nickel containing material.

12. The process according to claim 11, wherein the interior of said reaction vessel is heated to a temperature in the range of 87° C. to 93° C.

13. The process according to claim 1, wherein said nickel salt solution comprises a nickel sulfate solution, a nickel nitrate solution, or a nickel chloride solution.

14. The process according to claim 1, wherein said nickel salt solution comprises a nickel sulfate solution.

15. The process according to claim 14, wherein said nickel sulfate solution has a concentration of nickel metal of about 10 weight percent.

16. The process according to claim 14 further comprising the step of:
   4) reacting said nickel salt solution with a reactant to form nickel hydroxide.

17. The process according to claim 14, further comprising the step of:
   4) separating the nickel salt from said nickel salt solution.

18. The process according to claim 17, wherein said step of separating the nickel salt from said nickel salt solution comprises heating said nickel salt solution until the nickel salt precipitates out of said nickel salt solution.

19. The process according to claim 1, wherein said reaction forms water.

20. The process according to claim 19, wherein the moles of water formed in said reaction exceeds the moles of hydrogen gas formed in said reaction.

21. The process according to claim 1, wherein the moles of hydrogen gas formed from reacting said nickel with said oxygen-enriched acidic solution is less than the moles of hydrogen gas formed from said nickel in the presence of a non-oxygen-enriched acidic solution having the same acid concentration as said oxygen-enriched acidic solution.

22. The process according to claim 1, wherein said nickel containing material comprises a nickel metal powder.

23. The process according to claim 1, wherein said nickel containing material comprises a plurality of nickel particles having an average size of at least 0.1 mm.

24. The process according to claim 1, wherein said nickel containing material comprises a plurality of nickel particles having an average size of at least 1.0 mm.

25. The process according to claim 1, wherein said nickel containing material comprises a plurality of nickel particles having an average size of at least 10 mm.

26. The process according to claim 1, the dominant reaction during said step of reacting said nickel containing material with said oxygen-enriched acidic solution is: $Ni+H_2SO_4+\frac{1}{2}O_2 \rightarrow NiSO_4+H_2O$.

27. The process according to claim 1, wherein said reaction vessel is formed from fiberglass.

28. The process according to claim 1, wherein the oxygen level in said oxygen-enriched acidic solution is at least 25% of saturation level.

29. The process according to claim 1, wherein the oxygen level in said oxygen-enriched acidic solution is at least 50% of saturation level.

30. The process according to claim 1, wherein the oxygen level in said oxygen-enriched acidic solution is at least 75% of saturation level.

31. The process according to claim 1, wherein the oxygen level in said oxygen-enriched acidic solution is at least 100% of saturation level.

32. The process according to claim 1, wherein flow of the said oxygen-enriched acidic solution within said reactor is above laminar flow.

33. A process for converting a nickel containing material to a nickel salt solution comprising the steps of:
   1) providing said nickel containing material containing at least one material selected from the group consisting of pure nickel metal, nickel alloys, nickel ores and contaminated nickel metal to a fiberglass reaction vessel;
2) providing an oxygen-enriched acidic solution to said reaction vessel; and
3) reacting said nickel containing material with said oxygen-enriched acidic solution to produce said nickel salt solution.

34. The process according to claim 33, wherein said oxygen-enriched acidic solution comprises one or more acids selected from the group consisting of sulfuric acid, nitric acid, and hydrochloric acid.

35. The process according to claim 33, wherein said oxygen-enriched acidic solution comprises sulfuric acid.

36. The process according to claim 35, wherein said oxygen-enriched acidic solution has an acid concentration of about 1.0 M to 2.4 M.

37. The process according to claim 33, wherein said oxygen-enriched acidic solution has an acid concentration sufficient to dissolve the nickel in said nickel containing material.

38. The process according to claim 33, wherein said step of providing an oxygen-enriched acidic solution comprises the steps of:
1) supplying an acidic solution to said fiberglass reaction vessel;
2) supplying an oxygen containing stream to said fiberglass reaction vessel; and
3) contacting said acidic solution with said oxygen containing stream to dissolve oxygen from said oxygen containing stream into said acidic solution.

39. The process according to claim 38, wherein the pressure inside said reaction vessel is in a range of about 10 psi to about 150 psi.

40. The process according to claim 38, wherein said oxygen containing stream is supplied to said fiberglass reaction vessel at a pressure greater than the interior pressure of said fiberglass reaction vessel.

41. The process according to claim 40, wherein the pressure of said oxygen containing stream is at least 2 psi greater than the interior pressure of said fiberglass reaction vessel.

42. The process according to claim 38, wherein said oxygen containing stream comprises oxygen gas, air or a mixture thereof.

43. The process according to claim 33 further comprising the step of:
3) supplying heat to the interior of said fiberglass reaction vessel while said oxygen enriched solution is reacting with said nickel containing material.

44. The process according to claim 43, wherein the interior of said reaction vessel is heated to a temperature in the range of 87° C. to 93° C.

45. The process according to claim 33, wherein said nickel salt solution comprises a nickel sulfate solution, a nickel nitrate solution, or a nickel chloride solution.

46. The process according to claim 33, wherein said nickel salt solution comprises a nickel sulfate solution.

47. The process according to claim 46, wherein said nickel sulfate solution has a concentration of nickel metal of about 10 weight percent.

48. The process according to claim 46 further comprising the step of:
4) reacting said nickel sulfate solution with a reactant to form nickel hydroxide.

49. The process according to claim 33, further comprising the step of:
4) separating the nickel salt from said nickel salt solution.

50. The process according to claim 49, wherein said step of separating the nickel salt from said nickel salt solution comprises heating said nickel salt solution until the nickel salt precipitates out of said nickel salt solution.

51. The process according to claim 33, wherein said reaction forms water.

52. The process according to claim 51, wherein the moles of water formed in said reaction exceeds the moles of hydrogen gas toned in said reaction.

53. The process according to claim 33, wherein the moles of hydrogen gas formed from reacting said nickel with said oxygen-enriched acidic solution is less than the moles of hydrogen gas formed from said nickel in the presence of a non-oxygen-enriched acidic solution having the same acid concentration as said oxygen-enriched acidic solution.

54. The process according to claim 33, wherein said nickel containing material comprises a nickel metal powder.

55. The process according to claim 33, wherein said nickel containing material comprises a plurality of nickel particles having an average size of at least 0.1 mm.

56. The process according to claim 33, wherein said nickel containing material comprises a plurality of nickel particles having an average size of at least 1.0 mm.

57. The process according to claim 33, wherein said nickel containing material comprises a plurality of nickel particles having an average size of at least 10 mm.

58. The process according to claim 33, wherein the dominant reaction during said step of reacting said nickel containing material with said oxygen-enriched acidic solution is: $Ni+H_2SO_4+\frac{1}{2}O_2 \rightarrow NiSO_4+H_2O$.

59. The process according to claim 33, wherein the oxygen level in said oxygen-enriched acidic solution is at least 25% of saturation level.

60. The process according to claim 33, wherein the oxygen level in said oxygen-enriched acidic solution is at least 50% of saturation level.

61. The process according to claim 33, wherein the oxygen level in said oxygen-enriched acidic solution is at least 75% of saturation level.

62. The process according to claim 33, wherein the oxygen level in said oxygen-enriched acidic solution is at least 100% of saturation level.

63. The process according to claim 33, wherein flow of the said oxygen-enriched acidic solution within said reactor Is above laminar flow.

64. A process for converting nickel containing material to a nickel salt solution comprising the steps of:
1) providing said nickel containing material containing at least one material selected from the group consisting of pure nickel metal, nickel alloys, nickel ores and contaminated nickel metal to a reaction vessel;
2 2) providing an oxygen-enriched acidic solution having an oxygen concentration greater than 0.8 mmol/l to said reaction vessel;
3) heating said reaction vessel to a temperature in the range of 85° C. to 100° C.; and
4) reacting said nickel containing material with said oxygen-enriched acidic solution to produce said nickel salt solution.

65. The process according to claim 64, wherein said oxygen-enriched acidic solution comprises one or more acids selected from the group consisting of sulfuric acid, nitric acid, and hydrochloric acid.

66. The process according to claim 64, wherein said oxygen-enriched acidic solution comprises sulfuric acid.

67. The process according to claim 66, wherein said oxygen-enriched acidic solution has an acid concentration of about 1.0 M to 2.4 M.

68. The process according to claim 64, wherein said oxygen-enriched acidic solution has an acid concentration sufficient to dissolve the nickel in said nickel containing material.

69. The process according to claim 64, wherein said step of providing an oxygen-enriched acidic solution comprises the steps of:
1) supplying an acidic solution to said reaction vessel;
2) supplying an oxygen containing stream to said reaction vessel; and
3) contacting said acidic solution with said oxygen containing stream to dissolve oxygen from said oxygen containing stream into said acidic solution.

70. The process according to claim 69, wherein the pressure inside said reaction vessel is in a range of about 10 psi to about 150 psi.

71. The process according to claim 69, wherein said oxygen containing stream is supplied to said reaction vessel at a pressure greater than the interior pressure of said reaction vessel.

72. The process according to claim 71, wherein the pressure of said oxygen containing stream is at least 2 psi greater than the interior pressure of said reaction vessel.

73. The process according to claim 69, wherein said oxygen containing stream comprises oxygen gas, air or a mixture thereof.

74. The process according to claim 64, wherein the interior of said reaction vessel is heated to a temperature in the range of 87° C. to 93° C.

75. The process according to claim 64, wherein said nickel salt solution comprises a nickel sulfate solution, a nickel nitrate solution, or a nickel chloride solution.

76. The process according to claim 64, wherein said nickel salt solution comprises a nickel sulfate solution.

77. The process according to claim 76, wherein said nickel sulfate solution has a concentration of nickel metal of about 10 weight percent.

78. The process according to claim 76 further comprising the step of:
4) reacting said nickel sulfate solution with a reactant to form nickel hydroxide.

79. The process according to claim 64, wherein said reaction forms water.

80. The process according to claim 79, wherein the moles of water formed in said reaction exceeds the moles of hydrogen gas formed in said reaction.

81. The process according to claim 64, wherein the moles of hydrogen gas formed from reacting said nickel with said oxygen-enriched acidic solution is less than the moles of hydrogen gas formed from said nickel in the presence of a non-oxygen-enriched acidic solution having the same acid concentration as said oxygen-enriched acidic solution.

82. The process according to claim 64, wherein said nickel containing material comprises a nickel metal powder.

83. The process according to claim 64, wherein said nickel containing material comprises a plurality of nickel particles having an average size of at least 0.1 mm.

84. The process according to claim 64, wherein said nickel containing material comprises a plurality of nickel particles having an average size of at least 1.0 mm.

85. The process according to claim 64, wherein the dominant reaction during said step of reacting said nickel containing material with said oxygen-enriched acidic solution is: $Ni+H_2SO_4+\frac{1}{2}O_2 \rightarrow NiSO_4+H_2O$.

86. The process according to claim 64, wherein said reaction vessel is formed from fiberglass.

87. A solution of high purity nickel sulfate with a carbon content less than 20 ppm, said solution of high purity nickel sulfate produced without a filtering step by the process comprising the steps of:
1) providing a bulk nickel containing material containing at least one material selected from the group consisting of pure nickel metal, nickel alloys, nickel ores and contaminated nickel metal to a reaction vessel;
2) providing an oxygen-enriched sulfuric acidic solution to said reaction vessel; and
3) reacting said nickel containing material with said oxygen-enriched acidic solution to produce said nickel salt solution.

88. The solution according to claim 87, wherein said oxygen-enriched acidic solution has an acid concentration of about 1.0 M to 2.4 M.

89. The solution according to claim 87 further comprising the step of:
4) supplying heat to the interior of said reaction vessel while said oxygen-enriched sulfuric acid solution is reacting with said nickel containing material.

90. The solution according to claim 89, wherein the interior of said reaction vessel is heated to a temperature in the range of 87° C. to 93° C.

91. The solution according to claim 87, wherein said bulk nickel containing material comprises a nickel metal powder.

92. The solution according to claim 87, wherein said bulk nickel containing material comprises a plurality of nickel particles having an average size of at least 0.1 mm.

93. The solution according to claim 87, wherein said bulk nickel containing material comprises a plurality of nickel particles having an average size of at least 1.0 mm.

94. The solution according to claim 87, wherein said bulk nickel containing material comprises a plurality of nickel particles having an average size of at least 10 mm.

95. The solution according to claim 87, wherein the dominant reaction during said step of reacting said nickel containing material with said oxygen-enriched acidic solution is: $Ni+H_2SO_4+\frac{1}{2}O_2 \rightarrow NiSO_4+H_2O$.

96. The solution according to claim 87, wherein said reaction vessel is formed from fiberglass.

97. The solution according to claim 87, wherein the oxygen level in said oxygen-enriched acidic solution is at least 25% saturation level.

98. The solution according to claim 87, wherein the oxygen level in said oxygen-enriched acidic solution is at least 50% of saturation level.

99. The solution according to claim 87, wherein the oxygen level in said oxygen-enriched acidic solution is at least 75% of saturation level.

100. The solution according to claim 87, wherein the oxygen level in said oxygen-enriched acidic solution is at least 100% of saturation level.

101. The solution according to claim 87, wherein flow of the said oxygen-enriched acidic solution within said reactor is above laminar flow.

* * * * *